(12) United States Patent
Ebert

(10) Patent No.: US 7,571,129 B2
(45) Date of Patent: Aug. 4, 2009

(54) APPARATUS AND METHODS OF VISUALIZING NUMERICAL BENCHMARKS

(75) Inventor: Peter Steffen Ebert, Menlo Park, CA (US)

(73) Assignee: SAP AG, Walldorf (DE)

( * ) Notice: Subject to any disclaimer, the term of this patent is extended or adjusted under 35 U.S.C. 154(b) by 1335 days.

(21) Appl. No.: 10/019,544

(22) PCT Filed: May 3, 2001

(86) PCT No.: PCT/US01/40658

§ 371 (c)(1),
(2), (4) Date: May 9, 2002

(87) PCT Pub. No.: WO01/84457

PCT Pub. Date: Nov. 8, 2001

(65) Prior Publication Data

US 2002/0152148 A1    Oct. 17, 2002

Related U.S. Application Data

(60) Provisional application No. 60/202,383, filed on May 4, 2000.

(51) Int. Cl.
*G06Q 40/00* (2006.01)
(52) U.S. Cl. .......................... 705/36 R; 705/38; 345/440
(58) Field of Classification Search .......... 705/35–38, 705/36 R, 10; 700/68; 345/24, 400–418, 345/440–475
See application file for complete search history.

(56) References Cited

U.S. PATENT DOCUMENTS

| | | | |
|---|---|---|---|
| 3,732,498 A | 5/1973 | Beckman et al. | 325/398 |
| 3,882,399 A | 5/1975 | Karpowycz et al. | 325/455 |
| 3,987,401 A | 10/1976 | Irving | 325/455 |
| 4,491,974 A | 1/1985 | Bouchant | 455/159 |
| 5,369,416 A | 11/1994 | Haverty et al. | 345/39 |
| 5,696,832 A | 12/1997 | Sanders | 381/56 |
| 5,999,193 A * | 12/1999 | Conley et al. | 345/440 |
| 6,078,924 A * | 6/2000 | Ainsbury et al. | 707/101 |
| 6,327,571 B1 * | 12/2001 | Khayat et al. | 705/10 |
| 7,165,044 B1 * | 1/2007 | Chaffee | 705/37 |

OTHER PUBLICATIONS

Exploring Data Website. http://curriculum.qed.qld.gov.au/kla/eda. Education Queensland, 1997. p. 1-12.*
Owner's Manual for Chromatic Tuner CA-20, KORG, Inc., Tokyo, Japan, 1998, 4 pages.

* cited by examiner

*Primary Examiner*—Hani Kazimi
*Assistant Examiner*—Daniel Kesack
(74) *Attorney, Agent, or Firm*—Finnegan, Henderson, Farabow, Garrett & Dunner, LLP

(57) ABSTRACT

Methods and apparatus for visualizing numerical benchmarks are disclosed, wherein a display containing information relating to the general performance of a business in relation to its industry is created. The display incorporates the lower quartile value, the median value, and the upper quartile value of an industry. The display further incorporates the business ratio value. The display further includes indications of whether the business ratio value demonstrates good performance or poor performance of the business in relation to its industry. Thus, a user viewing the display can determine what a particular business' general performance is in relation to the lower quartile value, median value, and upper quartile value of its industry.

27 Claims, 9 Drawing Sheets

| Ratio | Company X Ratio | Lower Quartile | Median | Upper Quartile |
|---|---|---|---|---|
| Quick Ratio | 0.5 | 0.6 | 0.8 | 1.6 |
| Current Ratio | 1.1 | 1.5 | 2.2 | 3.7 |
| Current Liabilities to Net Worth | 96.00% | 149.50% | 57.90% | 24.20% |
| Current Liabilities to Inventory | 216.90% | 128.60% | 81.30% | 47.40% |
| Total Liabilities to Net Worth | 290.40% | 217.70% | 108.40% | 36.80% |
| Fixed Assets to Net Worth | 81.00% | 100.10% | 48.50% | 17.30% |
| Collection Period (days) | 184.40 | 58.00 | 42.70 | 26.70 |
| Sales to Inventory | 1.50 | 3.60 | 6.10 | 9.00 |
| Assets to Sales | 427.70% | 83.20% | 57.70% | 44% |
| Sales to Net Working Capital | 8.3 | 3.4 | 4.8 | 10.7 |
| Accounts Payable to Sales | 36.90% | 9% | 6% | 2.60% |
| Return on Sales | 9.30% | 2.20% | 4.60% | 8.80% |
| Return on Assets | 2.20% | 3.80% | 7.20% | 15.30% |
| Return on Equity | 6.30% | 9.20% | 15.50% | 25.10% |

*FIG. 6*

APPARATUS AND METHODS OF VISUALIZING NUMERICAL BENCHMARKS

RELATED APPLICATION DATA

This application is related to and claims priority to U.S. Provisional Application No. 60/202,383, filed May 4, 2000, entitled "Method of Visualizing Complex Benchmarks," which is expressly incorporated herein by reference in its entirety.

BACKGROUND OF THE INVENTION

1. Field of the Invention

This invention relates generally to numerical benchmarks, and more specifically, to methods and systems for visualizing numerical benchmarks.

2. Description of Related Art

When conducting any type of business transaction today, it is important to understand what the general performance of a business is in relation to its industry. For example, Dun & Bradstreet, a business data provider, provides information that relates to the general performance of a business, including the fourteen "business ratios". These ratios are known in the art of benchmarking as described below. Understanding this information in full can be a tedious process with the tools that are currently available.

Currently, this information is provided by Dun & Bradstreet in the form of a spreadsheet wherein there can be five columns of data, including the name of the business ratio, the business ratio, the industry upper quartile, the industry median and the industry lower quartile. In interpreting each business ratio, the business ratio would need to be compared to the industry lower quartile, the industry median and the industry upper quartile for each of the fourteen ratios. However, interpreting this information can be difficult and time consuming. Further, it can be difficult to visualize exactly what the general performance of the business, in light of these ratios, is in relation to its industry.

Additionally, for some of the business ratios, a higher value means a better performance, although, for some other business ratios, a lower value means a better performance. It is not always apparent for which of these ratios a lower value is preferable and for which values a higher value is preferable. Thus, there is a need for a system that provides for efficiently interpreting benchmarks.

SUMMARY OF THE INVENTION

In accordance with the invention, as embodied and broadly described herein, methods and systems consistent with the principles of the invention provide for visualizing numerical benchmarks to interpret performance of a business, comprising accessing information relating to general performance of a business in relation to an industry wherein the information includes a business ratio value, an industry lower quartile value, an industry median value and an industry upper quartile value; processing the information; and creating a display, including in the display the lower quartile value, the median value, and the upper quartile value of the industry wherein the business ratio value is indicated in relation to the industry lower quartile value, industry median value, and industry upper quartile value and further including in the display at least one reference demarcation regarding a performance of the business in relation to the industry.

In accordance with another aspect of the invention, as embodied and broadly described herein, methods and systems for visualizing numerical benchmarks, comprising accessing information wherein the information includes a lower value, a median value, an upper value and a comparative value; processing the information; and creating a display, including in the display the lower value, the median value, and the upper value wherein the comparative value is indicated in relation to the lower value, the median value and the upper value, and further including in the display at least one reference demarcation indicating the performance of the comparative value.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

The accompanying drawings, which are incorporated in and constitute a part of this specification, illustrate the embodiments of the invention and, together with the description, explain the principles of the invention. In the drawings.

FIG. 6 depicts the contents of an exemplary spreadsheet file containing data for viewing in a manner consistent with the principles of the present invention.

DETAILED DESCRIPTION

Reference will now be made in detail to the principles of the invention, examples of which are illustrated in the accompanying drawings. Wherever possible, the same reference numbers will be used throughout the drawings to refer to the same or like parts.

Overview

The present invention relates generally to methods for visualizing numerical benchmarks. The present invention can relate to visualizing any form of numerical benchmark and its referral to business performance is merely exemplary. Methods and apparatus consistent with the present invention can provide for creating a display containing information relating to the general performance of a business in relation to its industry. The display incorporates the lower quartile value, the median value, and the upper quartile value of an industry. The display further incorporates the business ratio value and indications of whether the business ratio value demonstrates good performance or poor performance of the business in relation to its industry. Thus, a user viewing the display can efficiently determine what a particular business' general performance is in relation to the lower quartile value, median value, and upper quartile value of its industry.

System Architecture

Figure 1:
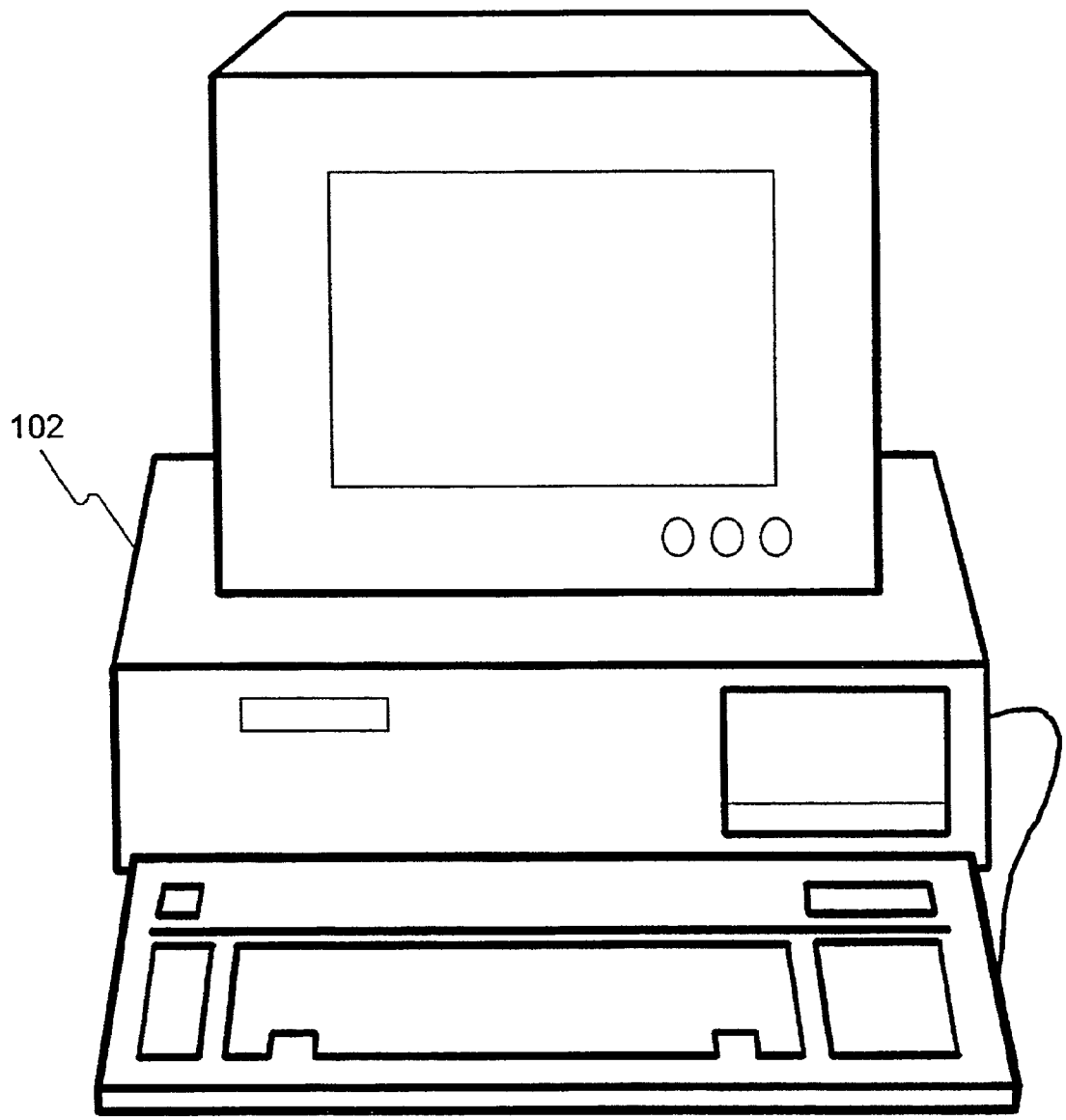
FIG. 1 is an exemplary computer system environment for implementing the features of the principles of the present invention.

FIG. 1 is an exemplary diagram of a computer within which the principles of the present invention can be implemented. The components of computer 102 can be implemented through any suitable combinations of hardware and software and/or firmware. As shown in FIG. 1, the principles of the present invention can be implemented in computer 102.

Figure 2:
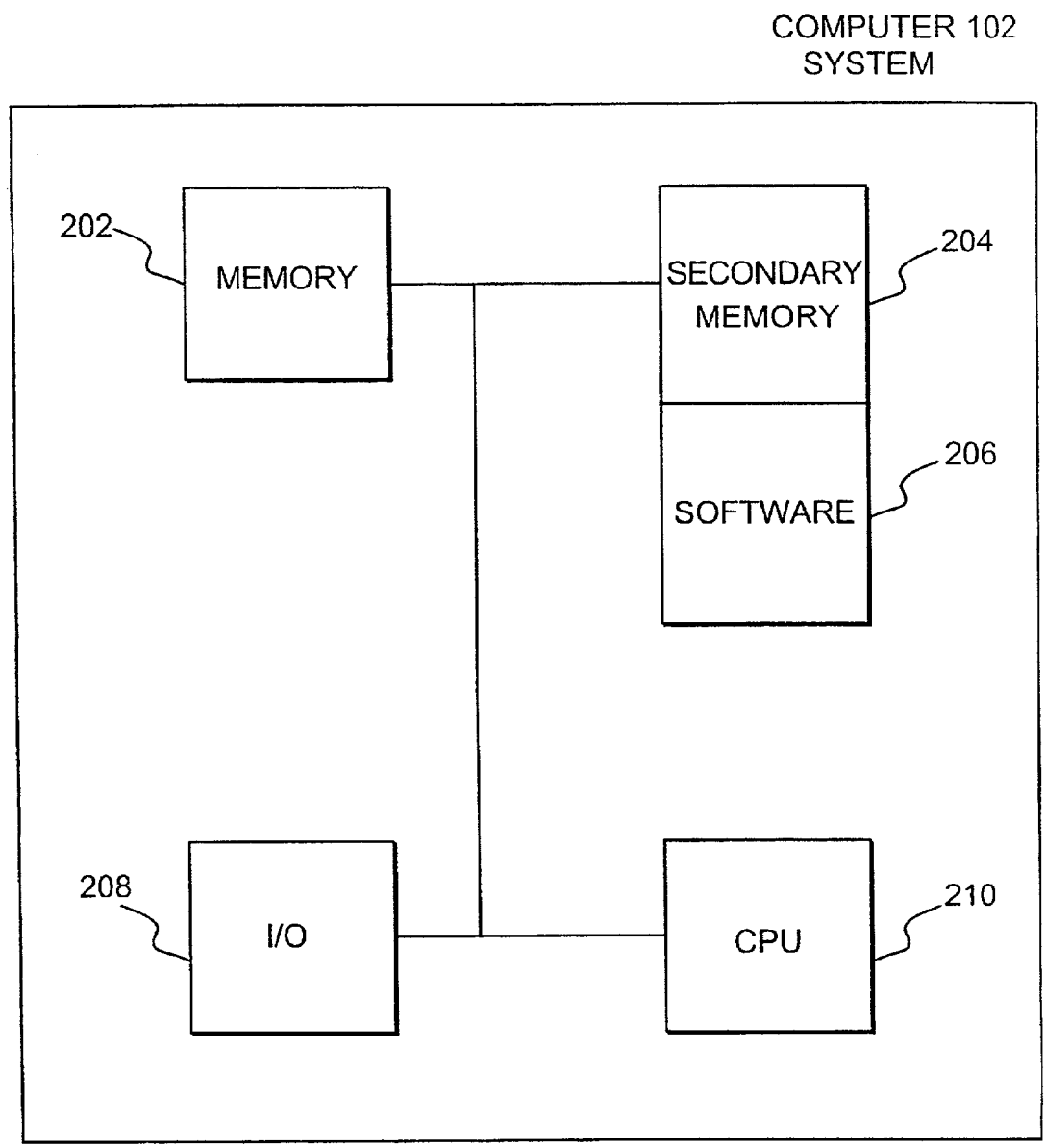
FIG. 2 is an exemplary block diagram of the components of a computer system consistent with the principles of the present invention.

FIG. 2 depicts an exemplary block diagram of the components contained in computer 102. Computer 102 includes conventional components including memory 202, secondary memory 204, including software 206, input/output devices 208 and central processing unit 210. Software 206 can include a spreadsheet application for the loading and storing of the industry values and the business ratio value. Software 206 may also include instructions for interpreting these industry values and business ratio value to create a display consistent with the principles of the present invention.

Creating a Display

Figure 3:
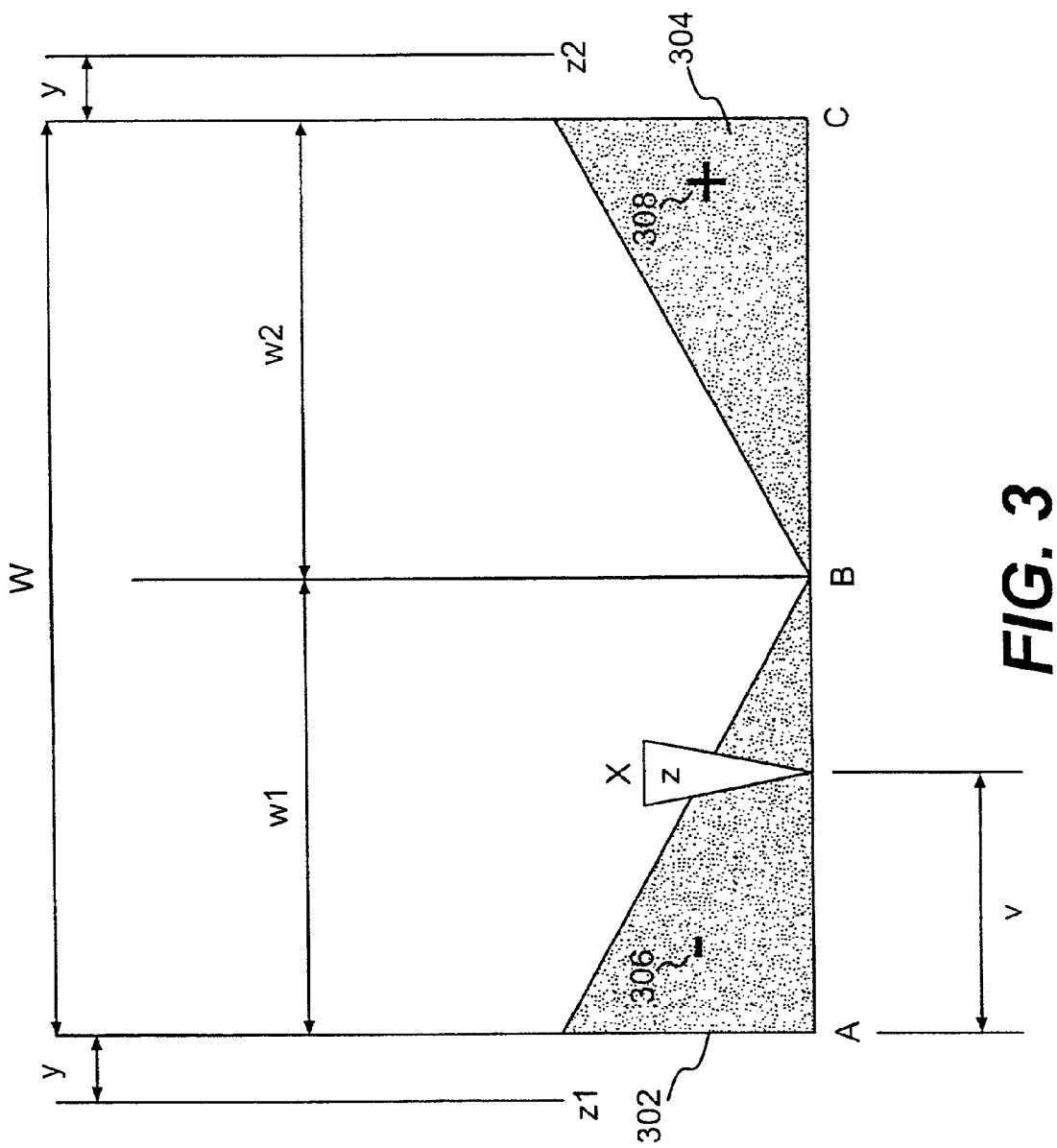
FIG. 3 is an exemplary diagram of an display incorporating features consistent with the principles of the present invention.

FIG. 3 depicts an exemplary diagram of an display incorporating principles consistent with the present invention. As shown in the display in FIG. 3, points A, B and C are indicated wherein A represents a lower quartile value, B represents a median value, and C represents an upper quartile value. The value w represents the distance between A and C. The values w1, representing the distance between A and B, and w2, representing the distance between B and C, are equal. X represents the business ratio value and is located in relation to values A, B, and C. As shown in FIG. 3, in this exemplary display, A<X<B, thus X is properly located between A and B. Regardless of the range of values between A and C, the display is as shown in FIG. 3. It can be appreciated by one of ordinary skill in the art that w1 does not have to equal w2. The systems and methods described herein may also apply where w1<>w2.

Position indicator z is an indicator that depicts where the business ratio value is located in relation to the industry values. The position indicator z is depicted as a triangle, however, one skilled in the art can appreciate that the position indicator z can be depicted in other forms, including various shapes or lines. The value v represents the distance between the position indicator z and the position of A. The positions z1 and z2 represent the position of indicator z when X does not fall within the range between A and C, and are located at a distance y from A and C, respectively.

As shown in FIG. 3, a pair of triangles 302, 304 are depicted, which, depending upon where triangle position indicator z is located, represent whether the business ratio value indicates good performance or poor performance. Triangle 302 contains minus sign 306. Triangle 304 contains plus sign 308. If the position indicator z is located within triangle 302, this indicates to the user that the business ratio value indicates poor performance. If the position indicator z is located within triangle 304, this indicates to the user that the business ratio value indicates good performance. It can be appreciated by one of ordinary skill in the art that different methods can be used to differentiate between the two triangles. For example, the appearance of triangle 302 may be different than the appearance of triangle 304, i.e., triangle 302 can be a red color, and triangle 304 can be a green color. The red color can be used to indicate those values where the business performance is worse than the industry median. The green color can be used to indicate those values where the business performance is better than the industry median. Further, combinations of these methods can be used, for example, a minus sign can be indicated in a red triangle.

It can further be appreciated by one of ordinary skill in the art that different techniques can be used to differentiate triangle 302 from triangle 304. For example, different colors can be used, different shading can be used, different textures can be used, etc. It can further be appreciated that triangle 302 can be any type of demarcation including a different shape, for example, a curve. By viewing the business ratio in relating to the industry lower quartile, median and upper quartile, in conjunction with the different colored triangles, one look at this display will tell a user exactly where a business falls in relation to its industry, and whether the business is better or worse than the industry median without the user performing any complicated analysis of spreadsheet data.

Figure 4:
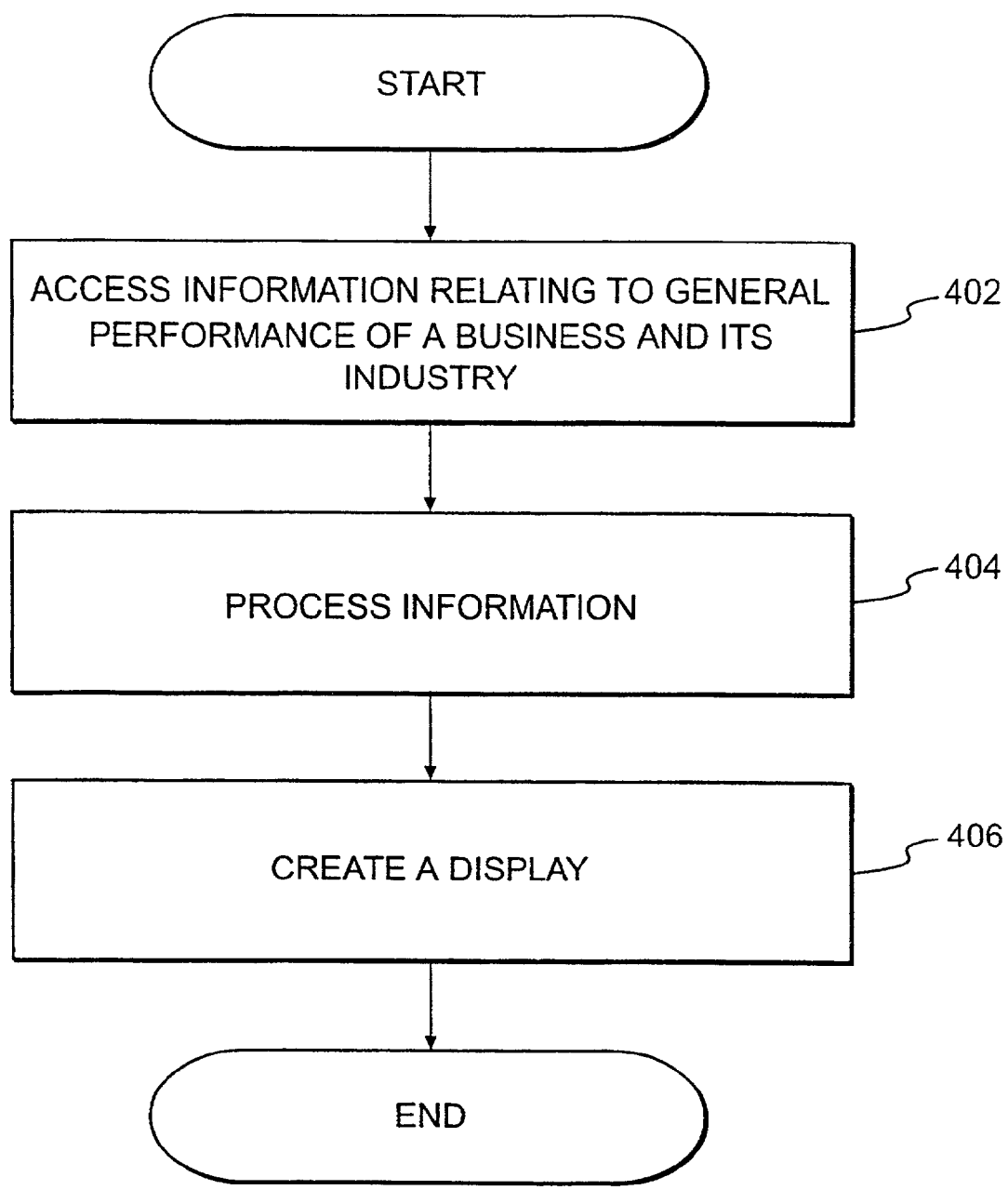
FIG. 4 is an exemplary flow diagram of the general steps performed by a system to create a display consistent with the principles of the present invention.

FIG. 4 depicts a flow diagram of the general steps taken to create a display consistent with the principles of the present invention. First, the system accesses information relating to the general performance of a business and its related industry (Step 402). This information may include the business ratio value, the industry lower quartile, the industry median, and the industry upper quartile and can be accessed from a spreadsheet software application located within software 206 of computer 102. This information can be loaded into the spreadsheet software program from a publisher, for example, Dun and Bradstreet, through conventional means, including a floppy diskette, a CD-ROM, or through a network, such as the Internet, and loaded into a spreadsheet application. The system then processes this information (Step 404) as set forth and described with respect to FIGS. 5A-5C, and creates a display based on the interpreted information (Step 406) as set forth and described hereinafter with respect to FIGS. 6 and 7 below.

Figure 5A:
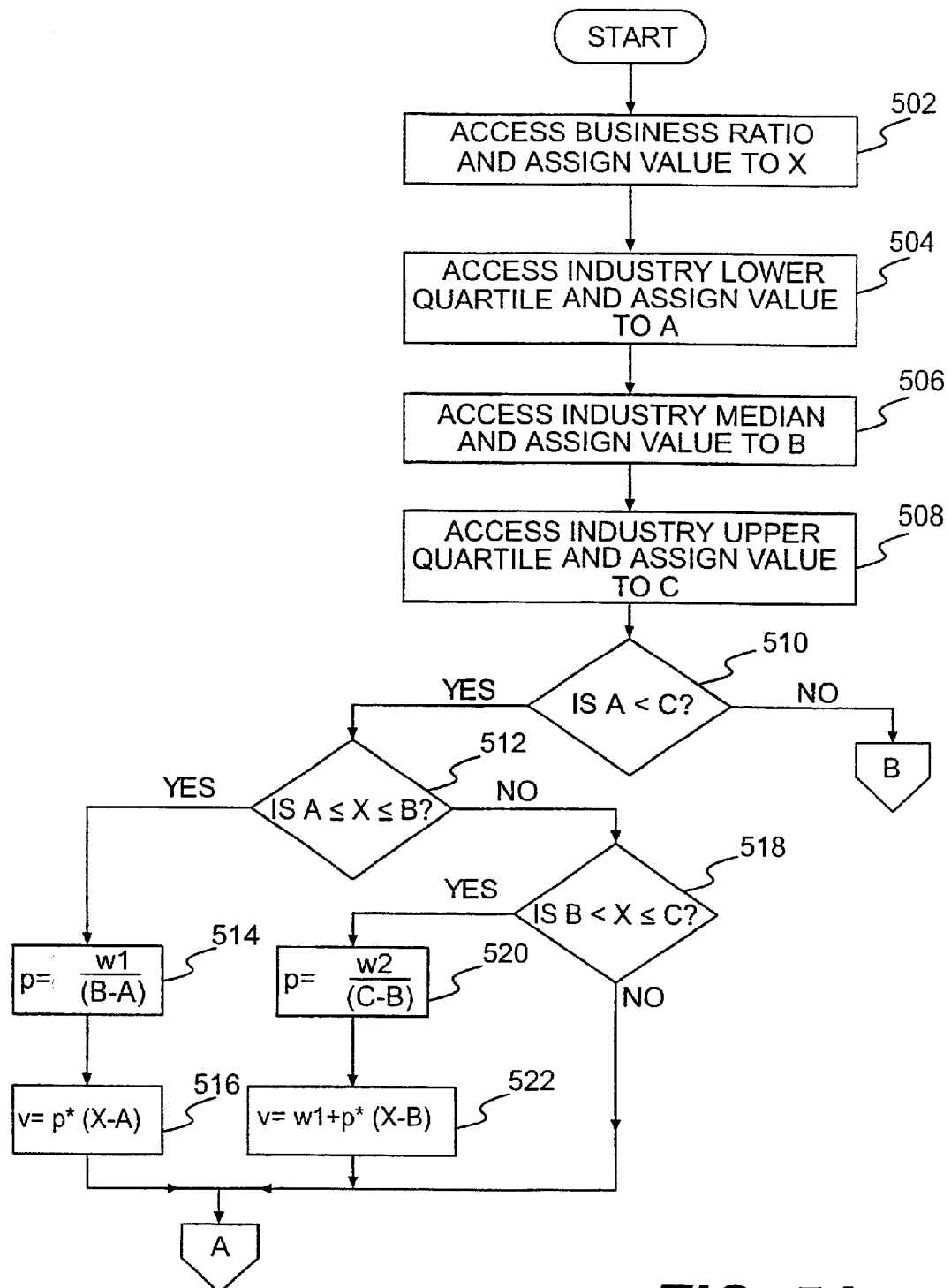
FIGS. 5A-5C depicts an exemplary flow diagram of the steps performed by a system in creating a display for viewing numerical benchmarks consistent with the principles of the present invention.
Figure 5B:
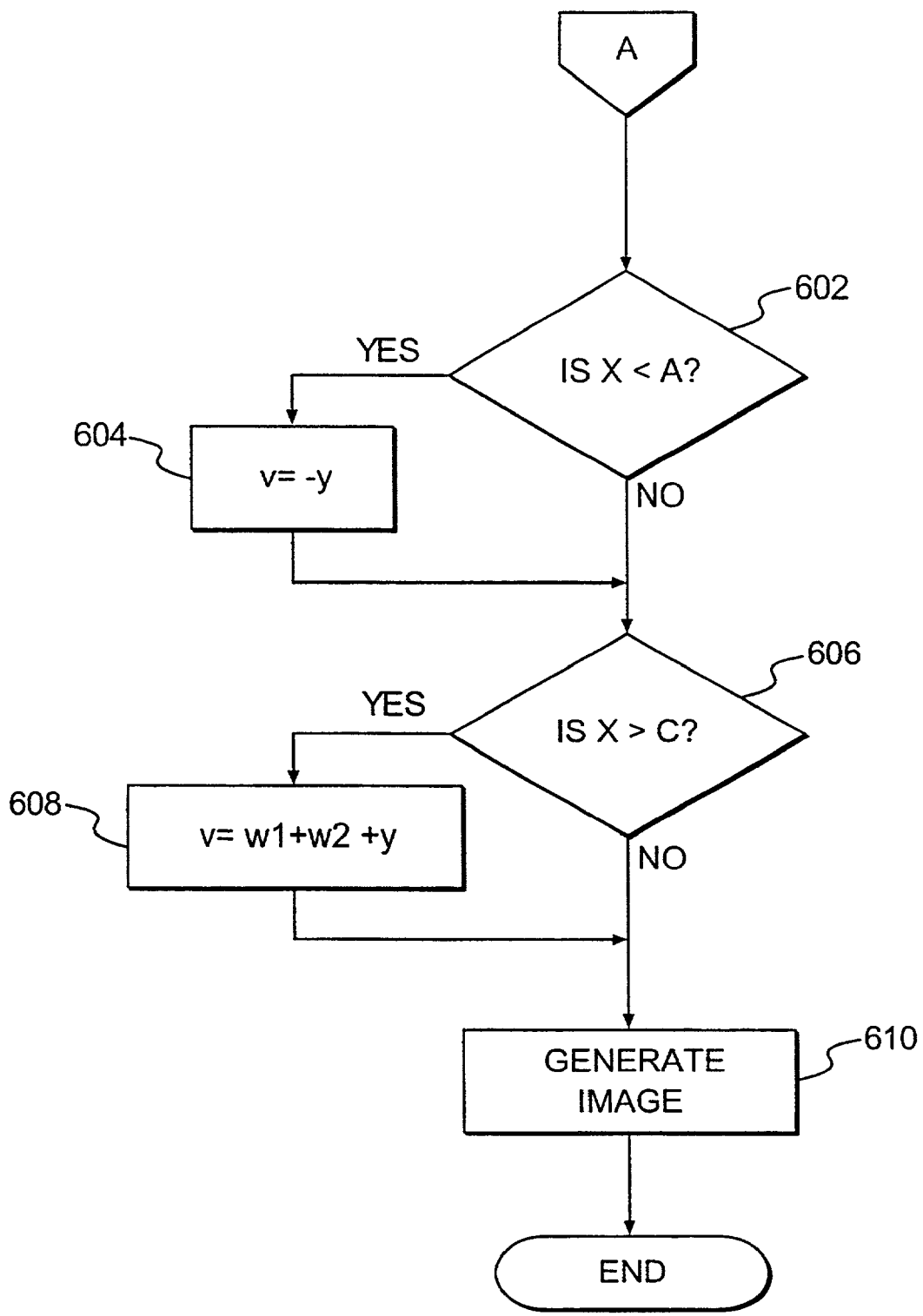
Figure 5C:
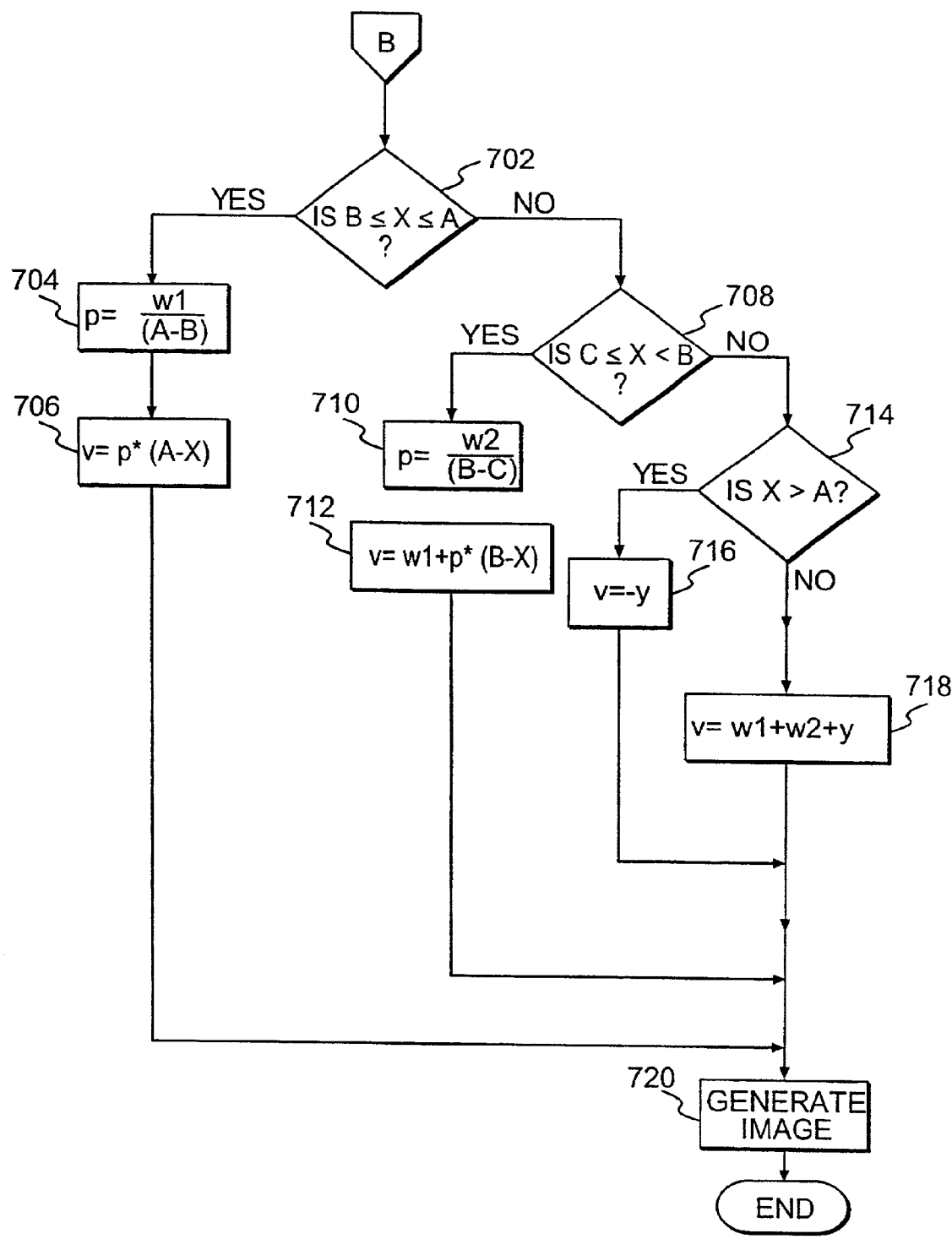

FIGS. 5A-5C depict an exemplary flow diagram of the steps performed by a system in creating a display for viewing numerical benchmarks consistent with the principles of the present invention. The system accesses the business ratio value from the spreadsheet application and assigns this value to X (Step 502). This information, as provided by, for example, Dun & Bradstreet, can be obtained from the spreadsheet application located in software 206. The system further accesses the industry lower quartile and assigns that value to A (Step 504). The system further accesses the industry median and assigns that value to B (Step 506). The system further accesses the industry upper quartile and assigns that value to C (Step 508). These values, as provided by, for example, Dun & Bradstreet, can also be obtained from the spreadsheet application located in software 206. It can be appreciated to one of ordinary skill in the art that these values can be obtained from other locations, including a word processing application, or they can be entered by a user through I/O devices 208.

After these values are obtained, the system determines whether A<C (step 510). If A<C (Step 510, yes), a second determination is made to see whether A$\leq$X$\leq$B (Step 512). If A$\leq$X$\leq$B (Step 512, yes), the indicator z, representing business ratio X, is located on the left hand side of the display. The value p, which is used to determine the value v, is set to w1/(B−A) (Step 514). The value v, representing the distance between A and the position of indicator z, is equal to p*(X−A) (Step 516). If A$\leq$X$\leq$B (Step 512, no), then the system determines whether $B<X\leq C$ (Step 518). If $B<X\leq C$ (Step 518, yes), the indicator z, representing business ratio X, is located on the right hand side of the display. The value $p=w2/(C-B)$ (Step 520) and $v=w1+p*(X-B)$ (Step 522). If $B<X\leq C$ (Step 518, no), processing proceeds to the steps depicted in FIG. 5B.

As shown in FIG. 5B, since the determinations above revealed that the business ratio value was not located within the range of A-C, the system determines whether $X<A$ (Step 602). If $X<A$ (Step 602, yes), the value $v=-y$ (Step 604), wherein the position indicator is located at a distance y to the left of value A. If $X\leq A$ (Step 602, no), the system determines whether $X>C$ (Step 606). If $X>C$ (Step 606, yes), then the $v=w1+w2+y$ (Step 608). The display is then created by replacing the variables in FIG. 3 with the values A, B, C, X, and v (Step 610).

If, as shown in FIG. 5A, $A<C$ (Step 510, no), then processing proceeds to the steps depicted in FIG. 5C. As shown in FIG. 5C, the system determines whether $B\leq X\leq A$ (Step 702). If $B\leq X\leq A$ (Step 702, yes), then the value $p=w1/(A-B)$ (Step 704) and the value $v=p*(A-X)$ (Step 706). Indicator z would be located on the left side of the display. If $B\leq X\leq A$ (Step 702, no), the system then determines whether $C\leq X<B$ (Step 708). If $C\leq X<B$ (Step 708, yes), then the value $p=w2/(B-C)$ (Step 710) and the value $v=w1+p*(B-X)$ (Step 712) and indicator z is located on the right side of the display. If $C\leq X<B$ (Step 708, no), the system then determines if $X>A$ (Step 714). If $X>A$ (Step 714, yes), then the value $v=-y$ (Step 716). If $X>A$ (Step 714, no), then this necessarily means that $X<C$ and the value $v=w1+w2+y$ (Step 718). The display is then created by replacing the variables shown in FIG. 3 with the values A, B, C, X, and v (Step 720).

It can be appreciated by one of ordinary skill in the art that above systems and methods apply where $A<>B<>C$ and where either $A<B<C$ or $A>B>C$. If $A=B$, $B=C$, $A=C$, or any of the values are not provided in the spreadsheet file, this may produce a division by zero error and thus, an image may not be generated.

Applications

The systems and methods consistent with the principles of the present invention can be utilized in viewing the following exemplary business ratios based on those promulgated by Dun & Bradstreet:

Quick Ratio: a business ratio that measures the ability of a business to meet its current debts if creditors were to press for immediate payment.

Current Ratio: a business ratio that measures the ability of a business to meet its current debts.

Current Liabilities to Net Worth: a business ratio that is a measure of solvency of a business. This ratio indicates the amount due creditors within a year as a percentage of the owners' or stockholders' investment.

Current Liabilities to Inventory: a business ratio that is a measure of solvency of a business. This ratio indicates the percent of reliance on available inventory for payment of debt.

Total Liabilities to Net Worth: a business ratio that is a measure of solvency for a business. This ratio indicates how the sum of the business's debt relates to its equity.

Fixed Assets to Net Worth: a business ratio that is a measure of solvency for a business. This ratio indicates the percentage of assets which are fixed compared to equity capital.

Collection Period: a business ratio that is a measure of efficiency of a business. this ratio is defined as the accounts receivable times 365 days divided by the net sales.

Sales to Inventory: a business ratio that represents a measure of the efficiency of a business. This ratio measures the relationship of stock-to-sales of a business.

Assets to Sales: a business ratio that represents a measure of efficiency for a business. This ratio is equal to the total assets of the firm divided by the net sales. This ratio measures the dollar amount of investment in assets used per dollar of annual sales.

Sales to Net Working Capital: a business ratio that represents a measure of efficiency for a business. This ratio measures the number of times working capital turns over annually in relation to net sales.

Accounts Payable to Sales: a business ratio that represents a measure of efficiency for a business. This ratio measures how a business pays its suppliers in relation to the sales volume being transacted.

Return on Sales: a business ratio that represents a measure of profitability of a business and measures the profit after taxes on the year's sales. This ratio equals the net profits after taxes divided by net sales.

Return on Assets: a business ratio that represents a measure of profitability of a business. This ratio equals net profits after taxes divided by total assets. This ratio is regarded as a key indicator of profitability of a business and matches net profits after taxes with the assets used to earn the profits.

Return on Equity: a business ratio that represents a measure the profitability of a business. This ratio equals net income after all expenses and taxes divided by tangible assets. This ratio can also be calculated by dividing a business's annual income by its Book Value (or its earning per share by book value per share).

It can be appreciated that other business, financial or accounting ratios can be viewed or printed out using the systems and methods disclosed herein. It can further be appreciated that any type of numerical benchmark can be viewed or printed out using the systems and methods disclosed herein. For example, a lower value, a median value and an upper value can be used to relate a comparative value. Using the steps depicted in FIGS. 5A-5C, as discussed herein, a display can be created wherein the comparative value is indicated in relation to the lower, median and upper value.

FIG. 6 depicts the contents of an exemplary spreadsheet file containing data for viewing in a manner consistent with the principles of the present invention. As discussed above, this information may be supplied by a data provider, for example, Dun & Bradstreet. Upon request, Dun & Bradstreet would send information, contained in an electronic file, relating to the performance of a business in relation to its industry. This information may be formatted as shown in FIG. 6. As can be seen in FIG. 6, the spreadsheet file may contain five columns, entitled Ratio, Company X Ratio, Lower Quartile, Median and Upper Quartile. The column entitled Ratio contains the name of the ratio for which the information is provided. The column Company X Ratio contains the data for each ratio as it relates to Company X. The column Lower Quartile contains the data for each ratio as it relates to the lower quartile of the industry. The column Median contains the data for each ratio as it relates to the median of the industry. The column Upper Quartile contains the data for each ratio as it relates to the upper quartile of the industry.

Figure 7:
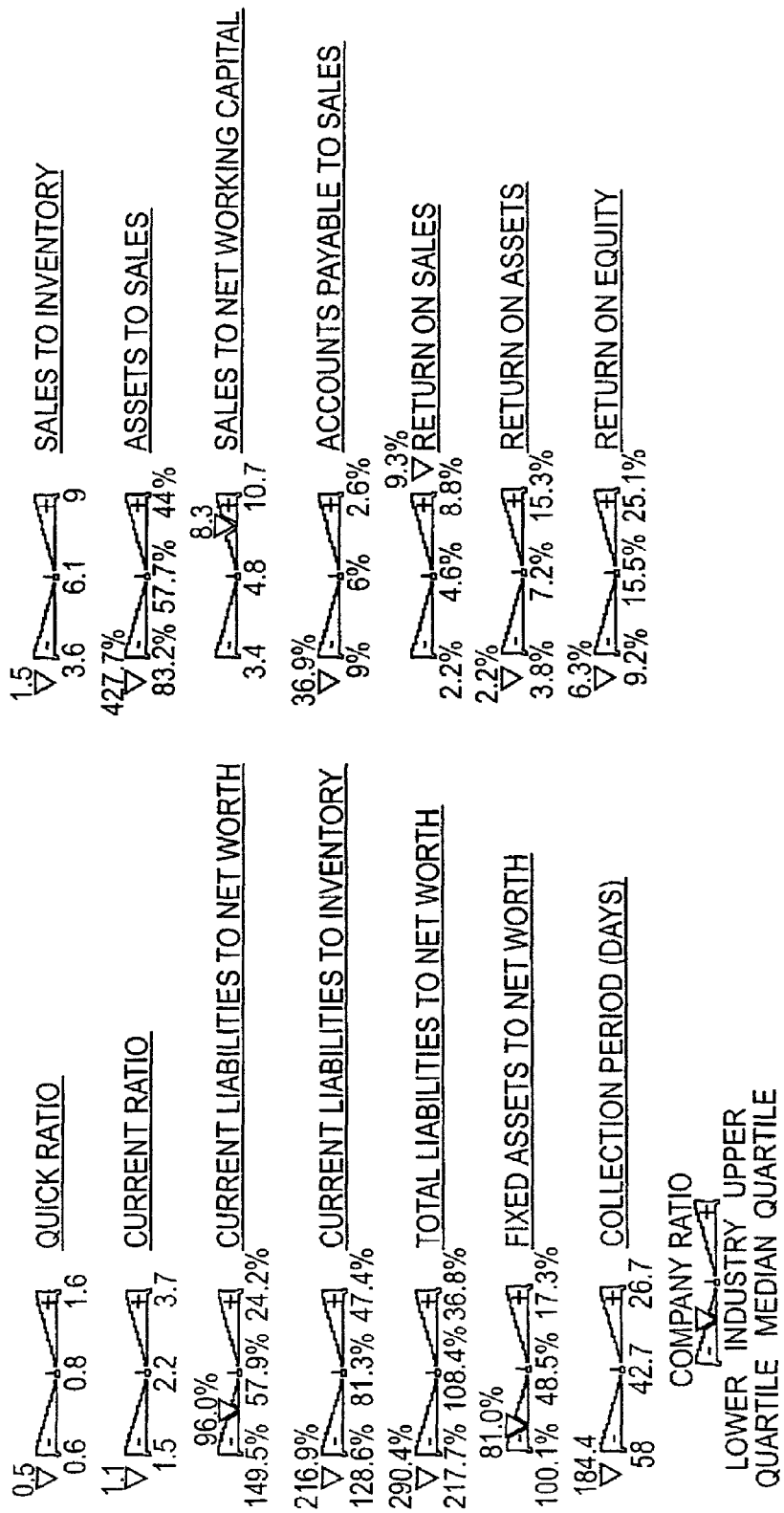
FIG. 7 depicts a display consistent with the principles of the present invention.

Using the steps set forth in FIGS. 5A-5C, as discussed above, this information is processed by system 102 to create a display as set forth in FIG. 7. One of ordinary skill in the art can appreciate how to generate graphic displays utilizing the data as produced by the methods and systems set forth herein. FIG. 7 contains a legend in the lower left portion of the display to indicate what the corresponding values represent. As shown in FIG. 7, the first ratio listed is the Quick Ratio, and contains the following information: Company X: 0.5; Lower Quartile: 0.6; Median: 0.8; and Upper Quartile: 1.6. Since the Company X value is less than the lower quartile value, position indicator z is located in position z1 (FIG. 3). The lower quartile value is located in the position where value A is located as set forth in FIG. 3. The median value is located in the position where value B is located as set forth in FIG. 3. The upper quartile value is located in the position where value C is located as set forth in FIG. 3. Additionally, there is a plus sign located in the right half of the display for the quick ratio and a minus sign located in the left half of the display for the quick ratio, indicating that Company X's performance for this ratio is poor.

The Current Liabilities to Net Worth display is the third ratio listed on the left in FIG. 7. The corresponding spreadsheet information is listed in FIG. 6. Since the Company X Ratio value is greater than the lower quartile value, but less than the median value, the position indicator z is properly located in triangle 302 (FIG. 3).

The Sales to Net Working Capital display is the third ratio listed on the right in FIG. 7. The corresponding spreadsheet information is listed in FIG. 6. Since the Company X Ratio value is greater than the median value, but less than the upper quartile value, the position indicator z is properly located in triangle 304 (FIG. 3).

The Return on Sales display is the fifth ratio listed on the right in FIG. 7. The corresponding spreadsheet information is listed in FIG. 6. Since the Company X Ratio value is greater than the upper quartile value, the position indicator z is properly located in position z2 (FIG. 3).

Modifications and adaptations of the present invention will be apparent to those skilled in the art from consideration of the specification and practice of the invention disclosed herein. The foregoing description of an implementation of the invention has been presented for purposes of illustration and description. It is not exhaustive and does not limit the invention to the precise form disclosed. Modifications and variations are possible in light of the above teachings or may be acquired from the practicing of the invention. For example, the described implementation includes software, but systems and methods consistent with the present invention may be implemented as a combination of hardware and software or in hardware alone. Additionally, although aspects of the present invention are described for being stored in memory, one skilled in the art will appreciate that these aspects can also be stored on other types of computer-readable media, such as secondary storage devices, for example, hard disks, floppy disks, or CD-ROM; the Internet or other propagation medium; or other forms of RAM or ROM. It is intended that the specification and examples be considered as exemplary only, with a true scope and spirit of the invention being indicated by the following claims.

What is claimed is:

1. A method for visualizing numerical benchmarks to interpret performance of a business, comprising:
   sending, utilizing an electronic interface, a first electronic request to a data provider directly from a user, the request specifying a business;
   sending, utilizing the electronic interface, a second electronic request to the data provider directly from a user, the request specifying an industry;
   receiving, utilizing the electronic interface, information electronically from the data provider relating to the general performance of the specified business in relation to the specified industry wherein the information includes a business ratio value, an industry lower quartile value, an industry median value and an industry upper quartile value;
   loading, utilizing a processor, the received information into a spreadsheet application; and
   creating, utilizing the processor, a display based on the information loaded into the spreadsheet application, including in the display a graphical shape bilaterally symmetric about a first axis and having a left and right side, the left side of the graphical shape being associated with the upper quartile value, the right side of the graphical shape being associated with the lower quartile value, and the first axis being associated with the median value, and further including in the display the lower quartile value, the median value, the upper quartile value of the industry, and at least one reference demarcation regarding a performance of the specified business in relation to the specified industry, wherein the business ratio value is indicated in relation to the industry lower quartile value, industry median value, and industry upper quartile value.

2. The method of claim 1, further comprising:
   determining, utilizing the processor whether the business ratio value is between the lower quartile value and the upper quartile value; and
   including in the display the lower quartile value, the median value and the upper quartile value, wherein the business ratio value is located between the lower quartile value and the upper quartile value, based on the determination that the business ratio value is between the lower quartile value and the upper quartile value.

3. The method of claim 1, further comprising:
   determining, utilizing the processor, whether the business ratio value is outside a range between the lower quartile value and the upper quartile value; and
   including in the display the lower quartile value, the median value, and the upper quartile value, wherein the business ratio value is located outside the range between the lower quartile value and the upper quartile value based on the determination that the business ratio value is at least one of less than the lower quartile value or greater than the upper quartile value.

4. The method of claim 1, wherein the business ratio value represents at least one of a quick ratio, a current ratio, a current liabilities to net worth ratio, a current liabilities to inventory ratio, a total liabilities to net worth ratio, a fixed assets to net worth ratio, a collection period ratio, a sales to inventory ratio, an assets to sales ratio, a sales to net working capital ratio, an accounts payable to sales ratio, a return on sales ratio, a return on assets ratio, and a return on equity ratio.

5. The method of claim 1, wherein the reference demarcation of the business ratio value includes using a first color to indicate performance of the business between the lower quartile value and the median value and using a second color to indicate performance of the business between the median value and the upper quartile value.

6. The method of claim 1, wherein reference demarcation of the business ratio value includes using a first shading to indicate performance of the business between the lower quartile value and the median value and using a second shading to indicate performance of the business between the median value and the upper quartile value.

7. The method of claim 1, wherein reference demarcation of the business ratio value includes using a minus sign to indicate performance of the business between the lower quartile value and the median value and using a plus sign to indicate performance of the business between the median value and the upper quartile value.

8. An apparatus for visualizing numerical benchmarks, comprising:
a memory having program instructions;
a display screen; and
a processor responsive to the program instructions to
send a first electronic request to a data provider directly from a user, the request specifying a business;
send a second electronic request to the data provider directly from a user, the request specifying an industry;
receive information electronically from the data provider relating to the general performance of the specified business in relation to the specified industry wherein the information includes a business ratio value, an industry lower quartile value, an industry median value and an industry upper quartile value;
loading the received information into a spreadsheet application; and
create a display based on the information loaded into the spreadsheet application, including in the display a graphical shape bilaterally symmetric about a first axis and having a left and right side, the left side of the graphical shape being associated with the upper quartile value, the right side of the graphical shape being associated with the lower quartile value, and the first axis being associated with the median value, and further including in the display the lower quartile value, the median value, the upper quartile value of the industry, and at least one reference demarcation regarding a performance of the specified business in relation to the specified industry, wherein the business ratio value is indicated in relation to the industry lower quartile value, industry median value, and industry upper quartile value.

9. The apparatus of claim 8, wherein the processor is further configured to:
determine whether the comparative value is between the lower value and the upper value; and
include in the display the lower value, the median value and the upper value, wherein the comparative value is positioned between the lower value and the upper value, based on the determination that the comparative value is between the lower value and the upper value.

10. The apparatus of claim 8, wherein the processor is further configured to:
determine whether the comparative value is outside a range between the lower value and the upper value; and
include in the display the lower value, the median value and the upper value, wherein the comparative value is located outside the range between the lower value and the upper value based on the determination that the comparative value is at least one of less than the lower value and greater than the upper value.

11. The apparatus of claim 8, wherein the processor is further configured to use a first color to indicate performance between the lower value and the median value and use a second color to indicate performance of the business between the median value and the upper value.

12. The apparatus of claim 8, wherein the processor is further configured to use a first shading to indicate performance of the comparative value between the lower value and the median value and use a second shading to indicate performance of the comparative value between the median value and the upper value.

13. The apparatus of claim 8, wherein the processor is further configured to use a minus sign to indicate performance of the comparative value between the lower value and the median value and use a plus sign to indicate performance of the comparative value between the median value and the upper value.

14. A computer-readable medium containing instructions for visualizing numerical benchmarks to interpret performance of a business, which, when executed by a processor, causes the processor to perform:
sending a first electronic request to a data provider directly from a user, the request specifying a business;
sending a second electronic request to the data provider directly from a user, the request specifying an industry;
receiving information electronically from the data provider relating to the general performance of the specified business in relation to the specified industry wherein the information includes a business ratio value, an industry lower quartile value, an industry median value and an industry upper quartile value;
loading the received information into a spreadsheet application; and
creating a display based on the information loaded into the spreadsheet application, including in the display a graphical shape bilaterally symmetric about a first axis and having a left and right side, the left side of the graphical shape being associated with the upper quartile value, the right side of the graphical shape being associated with the lower quartile value, and the first axis being associated with the median value, and further including in the display the lower quartile value, the median value, the upper quartile value of the industry, and at least one reference demarcation regarding a performance of the specified business in relation to the specified industry, wherein the business ratio value is indicated in relation to the industry lower quartile value, industry median value, and industry upper quartile value.

15. The computer-readable medium of claim 14, further comprising:
determining whether the business ratio value is between the lower quartile value and the upper quartile value; and
including in the display the lower quartile value, the median value and the upper quartile value, wherein the business ratio value is located between the lower quartile value and the upper quartile value, based on the determination that the business ratio value is between the lower quartile value and the upper quartile value.

16. The computer-readable medium of claim 14, further comprising:
determining whether the business ratio value is outside a range between the lower quartile value and the upper quartile value; and
including in the display the lower quartile value, the median value, and the upper quartile value, wherein the business ratio value is located outside the range between the lower quartile value and the upper quartile value based on the determination that the business ratio value is at least one of less than the lower quartile value or greater than the upper quartile value.

17. The computer-readable medium of claim 14, wherein the business ratio value represents at least one of a quick ratio, a current ratio, a current liabilities to net worth ratio, a current liabilities to inventory ratio, a total liabilities to net worth ratio, a fixed assets to net worth ratio, a collection period ratio, a sales to inventory ratio, an assets to sales ratio, a sales to net working capital ratio, an accounts payable to sales ratio, a return on sales ratio, a return on assets ratio, and a return on equity ratio.

18. The computer-readable medium of claim 14, wherein the reference demarcation of the business ratio value includes using a first color to indicate performance of the business between the lower quartile value and the median value and using a second color to indicate performance of the business between the median value and the upper quartile value.

19. The computer-readable medium of claim 14, wherein reference demarcation of the business ratio value includes using a first shading to indicate performance of the business between the lower quartile value and the median value and using a second shading to indicate performance of the business between the median value and the upper quartile value.

20. The computer-readable medium of claim 14, wherein reference demarcation of the business ratio value includes using a minus sign to indicate performance of the business between the lower quartile value and the median value and using a plus sign to indicate performance of the business between the median value and the upper quartile value.

21. A system for visualizing numerical benchmarks to interpret performance of a business, comprising:
hardware means for sending a first electronic request to a data provider directly from a user, the request specifying a business;
hardware means for sending a second electronic request to the data provider directly from a user, the request specifying an industry;
hardware means for receiving information electronically from the data provider relating to the general performance of the specified business in relation to the specified industry wherein the information includes a business ratio value, an industry lower quartile value, an industry median value and an industry upper quartile value;
hardware means for loading the received information into a spreadsheet application; and
hardware means for creating a display based on the information loaded into the spreadsheet application, including in the display a graphical shape bilaterally symmetric about a first axis and having a left and right side, the left side of the graphical shape being associated with the upper quartile value, the right side of the graphical shape being associated with the lower quartile value, and the first axis being associated with the median value, and further including in the display the lower quartile value, the median value, the upper quartile value of the industry, and at least one reference demarcation regarding a performance of the specified business in relation to the specified industry, wherein the business ratio value is indicated in relation to the industry lower quartile value, industry median value, and industry upper quartile value.

22. The system of claim 21, further comprising:
hardware means for determining whether the business ratio value is between the lower quartile value and the upper quartile value; and
hardware means for including in the display the lower quartile value, the median value and the upper quartile value, wherein the business ratio value is located between the lower quartile value and the upper quartile value, based on the determination that the business ratio value is between the lower quartile value and the upper quartile value.

23. The system of claim 21, further comprising:
hardware means for determining whether the business ratio value is outside a range between the lower quartile value and the upper quartile value; and
hardware means for including in the display the lower quartile value, the median value, and the upper quartile value, wherein the business ratio value is located outside the range between the lower quartile value and the upper quartile value based on the determination that the business ratio value is at least one of less than the lower quartile value or greater than the upper quartile value.

24. The system of claim 21, wherein the business ratio value represents at least one of a quick ratio, a current ratio, a current liabilities to net worth ratio, a current liabilities to inventory ratio, a total liabilities to net worth ratio, a fixed assets to net worth ratio, a collection period ratio, a sales to inventory ratio, an assets to sales ratio, a sales to net working capital ratio, an accounts payable to sales ratio, a return on sales ratio, a return on assets ratio, and a return on equity ratio.

25. The system of claim 21, wherein the reference demarcation of the business ratio value includes using a first color to indicate performance of the business between the lower quartile value and the median value and using a second color to indicate performance of the business between the median value and the upper quartile value.

26. The system of claim 21, wherein reference demarcation of the business ratio value includes using a first shading to indicate performance of the business between the lower quartile value and the median value and using a second shading to indicate performance of the business between the median value and the upper quartile value.

27. The system of claim 21, wherein reference demarcation of the business ratio value includes using a minus sign to indicate performance of the business between the lower quartile value and the median value and using a plus sign to indicate performance of the business between the median value and the upper quartile value.

* * * * *

UNITED STATES PATENT AND TRADEMARK OFFICE
CERTIFICATE OF CORRECTION

PATENT NO.       : 7,571,129 B2  
APPLICATION NO.  : 10/019544  
DATED            : August 4, 2009  
INVENTOR(S)      : Peter Steffen Ebert Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1598 days.

Signed and Sealed this

Seventh Day of September, 2010

David J. Kappos  
*Director of the United States Patent and Trademark Office*